Patented Apr. 23, 1935

1,998,539

UNITED STATES PATENT OFFICE 1,998,539

PROCESS FOR THE PRODUCTION OF COVERING LAYERS FROM CARBAMIDE-ALDEHYDE CONDENSATION PRODUCTS

Alphonse Gams and Willy Fisch, Basel, Switzerland, assignors to firm Society of Chemical Industry in Basle, Basel, Switzerland No Drawing. Application April 20, 1933, Serial No. 667,134. In Switzerland May 3, 1932

6 Claims. (Cl. 91—70)

The valuable mechanical and chemical properties of condensation products from carbamides and aldehydes, their fastness to light and freedom from odor, their freedom from color which permits them to be colored in any shade, their hardness and the high resistance to water of the molded products open a wide sphere of technical application for these artificial materials. Apart from their use for the production of molded articles of all kinds, they appear, owing to the properties above indicated, to be suitable in high degree for the production of coatings on various supports, so that in this manner articles having disadvantageous properties, such as odor, color or lack of resistance to water could be improved and their sphere of application greatly extended. Proposals having this object in view have in fact already frequently been made.

Thus solutions of carbamide-aldehyde condensation products in water or organic solvents have been recommended for directly coating articles and such solutions have also been proposed for impregnating paper or fabrics which are then applied by pressure to the surface which is to be coated. Another procedure consists in preparing from the aforesaid condensation products incompletely hardened sheets which, like the impregnated paper, are pressed on the support and at the same time completely hardened. All these processes, however, are associated with disadvantages.

When the solution of the condensation product is used as a varnish, it is possible to produce only thin layers, for it is exceedingly difficult to cause thicker layers to dry homogeneously and the layer tends to develop fissures. In the case of thin layers, however, it is difficult to produce a layer having a good covering power. In the case of porous supports the varnish penetrates deeply into the material to be coated and after the hardening operation there is produced on the surface a protective layer which is very thin and therefore lacks lustre and moreover is apt to appear spotted, since only a few supports have an absolutely homogeneous and uniform absorptive capacity. If pigments or other filling materials are incorporated in the varnishes, the varnish is absorbed in the support, whilst the filling material remains on its surface, this likewise leading to covering layers which are not uniform and have no lustre.

It has also been proposed to impregnate paper completely with such a varnish and to press it on the support after drying. In this manner there are obtained covering layers having good mechanical properties and improved covering power. However, even when the paper is completely saturated with the condensation product, it has proved impossible to produce surfaces of a pleasing appearance, for the agglomerations of fibre or the unevenly felted places present in the paper lead to irregularities in the surface which to the eye appear as spots.

This disadvantage can be avoided if there is used as the parent material a molding powder of a carbamide-aldehyde condensation product containing cellulose, for in this case there are present no agglomerations of fibre and moreover the fibre length has been so much reduced by grinding that no unevenly felted places can be formed and therefore no irregularities.

In order that is should not be necessary to forego the use of a material in sheet form, which is very convenient in practice for working up, it was then proposed to convert such molding powders by means of pressure and a raised temperature into the form of incompletely hardened films which were to be finally hardened after having been pressed onto the support. By means of this process it was possible to produce remarkable and completely homogeneous covering layers. However, the process was not completely successful because, especially in the case of a dense support, the film which was already partially hardened had not sufficient flow to cause it to combine firmly with the support, so that the covering layer did not adhere sufficiently. Moreover the production of films from a powder of the nature of dust is not technically a simple matter.

The present invention relates to a process for producing on supports of all kinds covering layers of carbamide-aldehyde condensation products, which avoids the disadvantages of the processes hereinbefore referred to and combines their advantages. The process of the invention consists in coating, or coating and impregnating, the support with a suspension of a solid carbamide-aldehyde condensation product in a suspension medium consisting of a solution of a carbamide-aldehyde condensation product. After the coating thus produced has been dried it is hardened by heat and pressure. The solution constituting the liquid phase of the suspension may be a solution in water or in an organic solvent of any of the various condensation products from carbamides and aldehydes which have become known in the art. As the solid phase there is used a dried and comminuted carbamide-aldehyde condensation product, which may in some cases contain a filling agent, particularly one of fibrous character. There are useful for the purpose, for example, the products which are available on the market as carbamide-aldehyde molding powders. The condensation products which are to constitute the solid phase must be condensed to such a degree that they are not dissolved, but only slightly swollen, by the liquid phase.

The disadvantages hereinbefore indicated of the hitherto known processes for applying covering layers of carbamide-aldehyde condensation products are removed by the use of a suspension in accordance with the invention. The liquid phase penetrates at least partially into the support and thus ensures a good adherence of the covering layer thereto. The solid phase, which remains on the surface of the support, constitutes, particularly when it contains a fibrous filling material, a very elastic covering layer which does not tear and yields a lustrous surface after pressing. The covering layer is completely uniform, since the material used in its production can be comminuted and mixed as intimately as desired by grinding in the dry state. When the suspension is allowed to dry after application to the support there is obtained even at ordinary temperature a compact and hard layer which is quite free from loose particles and is very easily manipulated.

In comparison with the suspension of the condensation product in water or the usual organic suspending agents, the suspensions used in accordance with the invention have a higher adhesive power, which is not only of advantage in the application of the suspension to the support but assists in causing the suspended particles to adhere to the support. Moreover, the presence of the soluble condensation product derived from the solution owing to its better capacity for flowing during the hardening operation, improves the uniformity of the covering layer.

The capacity of the condensation product for being wetted and brought into suspension can be increased by adding wetting agents of various kinds of the liquid phase. Suspensions of condensation products which have been condensed to such a degree that they swell in water only with difficulty should be stored for a day or so gently heated before use in order to facilitate swelling.

By suitable choice of the concentration (and hence of the viscosity) of the suspending agent, it is possible to produce either a more or less thorough impregnation of the support or merely to form a superficial covering layer on the support. The application of the suspension to the support is technically an extremely simple matter; thus the suspension may be applied by any of the customary known procedures, for example, by painting or spraying, by rolling, by immersion and so on. If required the adhesive capacity of the layer can be further increased by exposing the back of the support to a reduced pressure, so that the absorption of the suspension by the support is assisted. In the case of very dense supports or supports having smooth surfaces, such as cellulose esters, it is to be recommended that for producing the solution of a carbamide-aldehyde condensation product which is to constitute the liquid phase there be selected a solvent which consists wholly or in part of a swelling agent for the surfaces concerned, in order to increase the adherence of the covering layer to the support.

For the different procedures the suspension may be prepared with any viscosity suited to the procedure and varying from a paste having the consistency of dough to a thinly liquid suspension.

It will be understood that there may be incorporated in the finished suspensions or in the components thereof, at any stage of their production, coloring matters of any kind, luminous colors, bronze powders, metal filings and the like, also plasticizing agents; in this manner the optical and mechanical properties of the covering layers can be greatly influenced. Particular effects, such as an appearance of marble and so on, may be obtained by mixing incompletely differently colored suspensions before their application or by applying differently colored suspensions side by side or in superposed relationship. Similar results can also be attained by suspending together carbamide-aldehyde resins which are differently colored and in some cases may differ in their grain size and applying the suspension, or by scattering on an already coated but still moist surface a similarly or differently colored molding powder of a carbamide-aldehye resin, a dyestuff, pigment, bronze powder, metal filings or the like.

As supports in the sense of the present invention there are available materials of all kinds which are to be coated, or coated and impregnated, with a layer of a carbamide-aldehye condensation product for the purpose of protection or decoration. There come principally into question paper, cardboard, fabrics of vegetable, animal, mineral or artificial fibrous material, wood, veneers, leather, hydraulic masses and ceramic masses, asbestos cement masses, natural and artificial stones, as well as artificial masses (synthetic resins) of all kinds, such as phenol-aldehyde or amine-aldehyde condensation products, viscose, cellulose esters, cellulose ethers and so on.

For many purposes, particularly in the case of thick covering layers, it is advantageous first to produce the covering layer, per se in a form in which it is easily manipulated and can be transported and then to apply it to a surface by pressure. In accordance with the process of the invention, such covering layers can be produced in an excellent manner by treating paper or a fabric with a suspension so that it takes up a quantity of the binding agent such that it adheres sufficiently when pressed on a support without further treatment. Such paper or fabric, impregnated with the condensation product and having on one side a homogeneous layer of the solid condensation product is obtained for example by filtering a suspension of the kind described through these materials. The filtration may occur with the assistance of a difference in pressure, but it may be brought about in a more simple manner by making use of the absorptive action of the paper itself. For example, if the paper of a paper roll is conducted over the suspension in such a manner that one of its sides is in contact with the suspension, the paper immediately takes up the suspending agent so that the solid phase becomes attached to the surface of the paper. If the paper is passed over the suspension with a constant velocity, there is obtained on its surface a very uniform layer of solid condensation product. If the volume of liquid absorbed by the paper is insufficient to produce a layer of the required thickness, its absorptive capacity can be increased by means of a vacuum or by superimposing several layers of paper, the second and subsequent layers being again squeezed after they have absorbed liquid and thus again rendered capable of absorbing more liquid. Very suitable apparatus for applying a covering layer on paper or fabrics are, for example, the Fourdrinier paper machine, the cylinder machine, suction rollers and the rotary vacuum filter (Oliver filter). The web of paper or fabric is led over the strainer and is dried together with the layer produced on it. The liquid phase which has been filtered, can be again used as a suspending agent.

Papers and fabrics which have been treated in the manner described are suitable for various applications.

Papers and fabrics which have been coated and simultaneously impregnated can be molded into covering layers in two ways, since both the coated side and the impregnated side adhere well to the support after molding. If the coated side forms the external surface, there is obtained a completely uniform surface having a high lustre. In the other case completely different effects are obtained. In the case of paper there are obtained, in consequence of the property of pressed paper to become translucent, matt, and in some cases clouded shades, such as are desired for many purposes. In the case of fabrics, markings characteristic of woven articles become prominent in a pleasing manner. Quite particularly pleasing results are obtained in the latter case if there is used a printed fabric, for the colors become intensified by the impregnation and pressing. A like effect is obtained if a sheet of paper or fabric prepared as above described is used as an intermediate covering layer on the support and there is applied over it by pressure a printed material impregnated with a carbamide-aldehyde condensation product. Various effects can be obtained in this manner with the same printed pattern, according to the choice of the color of the intermediate layer.

It is also possible in accordance with the invention to produce covering layers which are easily manipulated and consist only of the solid condensation product. If a covering layer be applied on a support by means of suspension in the manner already described, the layer can be stripped from the support very easily at a suitable stage of the drying. When the layer is dried the individual particles cohere firmly and there is formed a hard object of the nature of a sheet and having good mechanical strength; such a sheet corresponds with the known films referred to in the opening paragraphs but is superior in various respects to these films. Thus its manufacture is simpler, since it is not necessary to start with a powder of the nature of dust; moreover, it has a better capacity for combining with a support to which it is applied, since it does not require a preliminary hardening.

The coated and impregnated papers and fabrics, as well as the covering layers described in the preceding paragraph can be firmly attached to various supports by pressure, or a number of layers of the material may be superposed and molded to produce a finished article.

If it is desired to provide, with a covering layer of a carbamide-aldehyde condensation product, and artificial mass made by superimposition and subsequent molding of sheets of paper, fabrics or the like impregnated with artificial resin—whether the binding agent be a phenol-aldehyde condensation product, an amino-aldehyde condensation product or another artificial resin—the production of the covering layer and of the artificial mass may be combined into one pressing operation. For this purpose the outermost layers of the mass are coated or impregnated with a suspension of the kind hereinbefore described and, after drying, the whole mass is subjected to a molding operation.

The term "carbamide-aldehyde condensation product" in the sense of the present invention is to be understood to include condensation products from urea and/or thiourea or a derivative thereof and formaldehyde or another aldehyde or an agent which yields an aldehyde.

The following examples illustrate the invention the parts being by weight:—

Example 1

300 parts of urea (5 mol.) and 76 parts of thiourea (1 mol.) are dissolved in 1000 parts of commercial formaldehyde of 36 per cent. strength (12 mol.), the whole is neutralized by the addition of 60 parts of active charcoal filtered and the filtrate heated under pressure for 3½ hours at 98° C. (A).

20 parts of the condensation solution A thus obtained are mixed with 1 part of thiourea and thoroughly kneaded with 5 parts of cellulose. The mass is then dried and ground together with 1-2 parts of lithopone (B). Then one part of the condensation solution A prepared as above described is mixed with 10 per cent. of its weight of thiourea and then mixed in a kneading machine with 1 part of the ground mass B. There is thus produced a paste (C) having a consistency such that it can be applied by a palette knife. It is suitable for application in this manner or by rolling. The mass is rolled on a plate consisting of an asbestos cement mass and dried at 70° C. whereupon the applied layer combines with the support to form a hard coherent covering layer which adheres well to the support. The plate is then subjected to a pressure of 150 kilos per sq. cm. for 4 minutes at 145° C., whereby there is produced a white, lustrous, homogeneous and firmly adherent coating.

There may be added to the condensation solution, to the molding or to the finished paste at any stage of the process a coloring matter, also a softening agent, bronze powder, mica, metal filings, a luminous color of the like, whereby different optical and mechanical effects can be produced.

Example 2

1 part of the paste C prepared as described in Example 1 is diluted with 1 part of the condensation solution A prepared as described in Example 1 and subsequently mixed with 10 per cent. of its weight of thiourea, whereby there is produced a suspension suitable for application by painting. A paper impregnated with an amine-formaldehyde condensation product and prepared for example as described in specification No. 398,268, is coated by painting in the usual manner with this suspension and dried, whereby the coating becomes attached to the paper as a coherent mass. The sheet thus prepared is used as the external sheet of a pile of paper sheets impregnated with an amine-formaldehyde condensation product and the whole is molded by heat and pressure. The normal color of the support is completely covered and there is obtained a homogeneous pure white surface.

Variegated marble or veined patterns can be obtained by scattering a dyestuff or pigment unevenly on the surface of the layer, advantageously whilst the latter is still moist; or by incompletely mixing two or more differently colored suspensions and using the mixture for producing the coating or by applying differently colored suspensions side by side or one over another; or by using for producing the paste differently colored carbamide-aldehyde condensation products which, if required, may differ also in their grain size.

Example 3

Urea is dissolved in a solution of formaldehyde of 38 per cent. strength so that the molecular ratio or urea to formaldehyde is 1:2. 15 parts of the solution are neutralized by the addition of active charcoal, filtered, heated in a closed autoclave for 8 hours at 98° C. and finally mixed with 1 part of thiourea. One part of the condensation solution thus prepared is made into a homogeneous paste in a kneading machine with 1 part of a moulding powder of a carbamide-aldehyde condensation product containing a pigment, for example a product known under the registered Trade Mark "Beetle". The paste is then diluted by the addition of a further 3 parts of the condensation solution prepared as above described. A paper web consisting of absorbent paper travelling around a roller is led over the suspension thus prepared in such a manner that one side of the web is just in contact with the suspension. The liquid is absorbed by the paper and a corresponding quantity of the solid phase is deposited on its surface. Thus the paper leaving the suspension is saturated with liquid condensation products and has on one side a uniform layer of solid condensation products. The web passes through a drying apparatus, whereby it becomes rigid and is cut or broken into pieces of the required size. The thickness of the covering layer can be varied within wide limits by suitable choice of the viscosity of the suspension and its dry content, as well as by varying the velocity with which the web travels over the suspension.

The sheets prepared as above described are superimposed in a sufficient number for producing a molded article of the required thickness and the pile is subjected to a pressure of 100 kilos per sq. cm. at 150° C. for 3 minutes. There is obtained a plate of good mechanical strength and having a color which is highly lustrous if the exterior layers are arranged with the covering layer to the outside, and matt and partially clouded if they are arranged with the impregnated surface to the outside. Single sheets can also be molded to yield thin flexible plates. If a luminous color be incorporated in the molding powder, the plates are visible in the dark.

Example 4

A plate prepared as described in Example 3 is molded by heat and pressure together with a mixture of 9 parts of sand and 1 part of a carbamide-aldehyde condensation product to produce a plate of which one side is porous and therefore capable of being attached by cementing, whereas the other side has a highly lustrous covering layer which may have any desired color.

Example 5

In accordance with the process described in British Patent No. 261,029, 120 parts of dimethylol urea and 174 parts of methanol are heated together with 3 parts of primary sodium phosphate in a closed vessel at 100° C. whilst stirring. After half-an-hour the condensation is completed, whereupon the whole is neutralized by the addition of tertiary sodium phosphate and filtered. Two parts of the solution are intimately mixed with one part of the white carbamide-aldehyde molding powder known under the registered Trade Mark "Pollopas", the mixture is applied to a printed material, such as silk, by painting and the coated material is dried. The sheet thus obtained is placed with its coated side in contact with a plate consisting of an amine formaldehyde condensation product and a suitable filling material and the whole is pressed. Owing to the impregnation of the fabric with the liquid phase of the suspension the colors of the fabric receive a surprisingly high lustre and the pattern stands out sharply.

Instead of the plate of an amino-formaldehyde condensation product there may be used plates of other artificial resins or other materials such as for instance asbestos cement and the like.

Example 6

The paste C obtained according to Example 1 is applied on a metal support by means of a rolling device and then dried to such an extent that the layer becomes sufficiently coherent and can be removed easily from the support. The layer is removed from the support and further dried, pressed if required between two calender rollers and when dry cut into sheets having a sufficient mechanical strength to permit their manipulation.

A sheet thus prepared is pressed on a plate of asbestos and cement at a raised temperature.

Example 7

240 parts of urea (4 mol.) and 152 parts of thiourea (2 mol.) are dissolved in 1000 parts of a solution of formaldehyde of 36 per cent. strength (12 mol.), the solution is neutralized by the addition of active charcoal, filtered and heated at 98° C. for 3 hours in an autoclave. 75 parts of thiourea are then added to the solution, the whole is evaporated to dryness under reduced pressure and the residue is ground and suspended in 2000 parts of an aqueous solution containing 5 per cent of a carbamide-aldehyde condensation product. The suspension is painted on a veneer, dried and pressed at a raised temperature. In this manner the veneer is provided on one side without further treatment with a lustrous surface which is highly resistant to scratching and to water. It may be attached by glueing to a board of ply wood or it may be used as the outer layer in the production of the ply wood.

In the production of lustrous layers on veneers, the suspensions used in accordance with the invention possess great advantages over solutions for the reasons indicated in the opening paragraphs. When there is used a varnish solution there is the danger that the wood will become impregnated with the condensation product and will become translucent when pressed, so that dark spots will appear and the characteristic veining will be lost.

Transparent lustrous coatings can be produced on leather by coating the leather with the suspension above described, drying and pressing at a raised temperature.

Example 8

A viscose film stretched on a support is painted with the suspension capable of being applied by painting and described in Example 2. The film is dried and then pressed with its coated side in contact with a plate consisting of an amine-formaldehyde condensation product and in some cases containing a fibrous filling material. The film constituting the outermost layer imparts, owing to its transparency, a high lustre to the underlying colored covering layer.

*Example 9*

One part of the paste C prepared as described in Example 1 is diluted with one part of aqueous acetone of 50 per cent. strength and applied by painting on a thin extended plate of acetyl cellulose. The plate is dried and pressed with its coated surface against a plate consisting of an asbestos cement mass. The presence of acetone causes a slight swelling of the acetyl cellulose plate and thus increases the adhesion.

What we claim is:—

1. A process of producing covering layers from carbamide-aldehyde condensation products on materials of any kind which comprises applying to the material a suspension of a powdered carbamide-aldehyde condensation product in a solution of a carbamide-aldehyde condensation product, drying the applied suspension and hardening the coherent solid coating thus obtained by heat and pressure.

2. A process of producing covering layers from carbamide-aldehyde condensation products on materials of any kind which comprises applying to the material a suspension of a mixture of fibrous material and of a powdered carbamide-aldehyde condensation product in a solution of a carbamide-aldehyde condensation product, drying the applied suspension and hardening the coherent solid coating thus obtained by heat and pressure.

3. A process of producing covering layers from urea-formaldehyde condensation products on materials of any kind which comprises applying to the material a suspension of a powdered urea-formaldehyde condensation product in a solution of a urea-formaldehyde condensation product, drying the applied suspension and hardening the coherent solid coating thus obtained by heat and pressure.

4. A process of producing covering layers from urea-formaldehyde condensation products on materials of any kind which comprises applying to the material a suspension of a mixture of fibrous material and of a powdered urea-formaldehyde condensation product in a solution of a urea-formaldehyde condensation product, drying the applied suspension and hardening the coherent solid coating thus obtained by heat and pressure.

5. A process of producing covering layers from mixed urea-thiourea-formaldehyde condensation products on materials of any kind, which comprises applying to the material a suspension of a powdered mixed urea-thiourea-formaldehyde condensation product, in a solution of a mixed urea-thiourea-formaldehyde condensation product, drying the applied suspension and hardening the coherent solid coating thus obtained by heat and pressure.

6. A process of producing covering layers from mixed urea-thiourea-formaldehyde condensation products, on materials of any kind, which comprises applying to the material a suspension of a mixture of fibrous material and of a powdered mixed urea-thiourea-formaldehyde condensation product in a solution of a mixed urea-thiourea-formaldehyde condensation product, drying the applied suspension and hardening the coherent solid coating thus obtained by heat and pressure.

ALPHONSE GAMS.
WILLY FISCH.